United States Patent
Fukano et al.

(10) Patent No.: US 8,303,007 B2
(45) Date of Patent: Nov. 6, 2012

(54) DRIVE MECHANISM AND GRIPPER MECHANISM EQUIPPED WITH DRIVE MECHANISM

(75) Inventors: Yoshihiro Fukano, Moriya (JP); Shoichi Makado, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 584 days.

(21) Appl. No.: 12/261,333

(22) Filed: Oct. 30, 2008

(65) Prior Publication Data

US 2009/0133524 A1 May 28, 2009

(30) Foreign Application Priority Data

Nov. 22, 2007 (JP) ................................ 2007-302760

(51) Int. Cl.
*B25J 15/08* (2006.01)
(52) U.S. Cl. .................. 294/119.1; 269/240; 901/38
(58) Field of Classification Search ............... 294/119.1, 294/88, 115, 192, 207; 269/218, 240, 242; 901/36, 38
See application file for complete search history.

(56) References Cited

U.S. PATENT DOCUMENTS

| | | | | |
|---|---|---|---|---|
| 3,261,479 A | * | 7/1966 | Baker et al. | 414/787 |
| 4,579,380 A | * | 4/1986 | Zaremsky et al. | 294/119.1 |
| 4,680,523 A | * | 7/1987 | Goumas et al. | 318/685 |
| 4,699,414 A | * | 10/1987 | Jones | 294/119.1 |
| 4,968,082 A | * | 11/1990 | Thinlot | 294/119.1 |
| 5,895,084 A | * | 4/1999 | Mauro | 294/100 |
| 6,345,815 B1 | | 2/2002 | Takanashi et al. | |
| 6,435,494 B2 | | 8/2002 | Takahashi et al. | |
| 6,700,231 B2 | | 3/2004 | Takamune et al. | |
| 2001/0028175 A1 | * | 10/2001 | Thompson et al. | 294/119.1 |

FOREIGN PATENT DOCUMENTS

| | | |
|---|---|---|
| CN | 1290591 A | 4/2001 |
| CN | 1293090 A | 5/2001 |
| DE | 28 51 961 A1 | 6/1979 |
| DE | 101 20 939 A1 | 10/2002 |
| DE | 20 2005 019 060 U1 | 3/2006 |
| JP | 5-345340 | 12/1993 |
| JP | 7-1153 | 1/1995 |
| JP | 8-150531 | 6/1996 |
| JP | 2001-162473 | 6/2001 |
| JP | 2001-187527 | 7/2001 |
| JP | 2005-161454 | 6/2005 |
| JP | 2007-247536 | 9/2007 |
| WO | WO 01/51239 A1 | 7/2001 |

OTHER PUBLICATIONS

Office Action issued Apr. 7, 2011, in German Patent Application No. 10 2008 057 386.8-15.

* cited by examiner

*Primary Examiner* — Dean Kramer
(74) *Attorney, Agent, or Firm* — Oblon, Spivak, McClelland, Maier & Neustadt, L.L.P.

(57) ABSTRACT

A drive mechanism and a gripper mechanism equipped with the drive mechanism are provided. An electrical gripper includes a drive mechanism equipped with a motor, a feed screw that transmits a rotary drive force from the motor to a feed nut capable of displacement in an axial direction, and a gripper section that grips a workpiece by coupling to the feed nut and being displaced thereby. The drive mechanism further is constituted by a self-locking mechanism, which prevents the feed nut from being retracted as a result of a reactive force received in the event that the feed nut is advanced and the workpiece is gripped by the gripper section.

17 Claims, 7 Drawing Sheets

DRIVE MECHANISM AND GRIPPER MECHANISM EQUIPPED WITH DRIVE MECHANISM

BACKGROUND OF THE INVENTION

1. Field of the Invention

The present invention relates to a drive mechanism, which is capable of pressing a workpiece by displacement of a displacement member under a driving action of a rotary drive source, and to a gripper mechanism equipped with such a drive mechanism.

2. Description of the Related Art

Heretofore, a drive mechanism has been used for pressing a workpiece by means of a displacement member, which is displaced under a driving action of a rotary drive source such as a motor or the like. For example, an electrical gripper (electrical chuck) for gripping various components or the like (workpieces) is known, the electrical gripper being attached to an end of a shaft or the like of a working machine, wherein an opening/closing operation of openable/closable gripper members is carried out using a drive force of the motor to grip the workpieces.

As such an electrical gripper, in Japanese Laid-Open Patent Publication No. 08-150531, a structure is disclosed in which a master jaw constituting a gripper section is driven by transmittal of a rotary drive force of a motor, whereupon a workpiece is gripped between the master jaw and a soft jaw.

However, generally, at times of emergency power stoppage, or when electrical power is interrupted, the generated force (drive torque) is lost, unless electrical energy is stored. As a result, it is necessary to perform continuous energizing of the gripper after the workpiece has been gripped by the gripper for maintaining the gripped state, and thus, the longer the retaining time is sustained, the more the electrical energy is consumed. On the other hand, when electrical power to the motor is stopped in a state where the workpiece is gripped, there is a potential for the workpiece to be dropped from the gripper.

SUMMARY OF THE INVENTION

A general object of the present invention is to provide a drive mechanism and a gripper mechanism equipped with such a drive mechanism in which, in cases where a rotary power source is stopped in case of emergency or upon interruption of electrical power or the like, the gripper mechanism can maintain the pressed condition of a pressing member against a workpiece, even in cases when transmittal of a drive force to the pressing member from the rotary drive source is halted.

Further, another object of the present invention is to provide a drive mechanism and a gripper mechanism equipped with such a drive mechanism, which is capable of reducing consumption of electrical energy.

According to an embodiment of the present invention, a drive mechanism is provided, including a rotary drive source, a feed screw that transmits a rotary drive force from the rotary drive source to a displacement member, which is capable of displacement in an axial direction, and a pressing member connected to the displacement member, for pressing a workpiece by coupling to the displacement member and being displaced thereby, wherein the feed screw further is constituted by a self-locking mechanism, which prevents the displacement member from being retracted as a result of a reactive force received from the workpiece by the pressing member in the case that the displacement member is advanced and the workpiece is pressed by the pressing member, and wherein the self-locking mechanism is capable of being released by transmittal of a rotary drive force from the rotary drive source to the feed screw.

Further, according to another embodiment of the present invention, a gripper mechanism is provided, including a gripper having a pair of gripper members for gripping a workpiece by approaching and separating away mutually with respect to each other, thereby opening and closing, and a drive mechanism having a displacement member displaced in an axial direction, the drive mechanism being coupled with displacement of the displacement member for openably/closably driving the gripper members by the displacement of the displacement member, the drive mechanism having a rotary drive source, and a feed screw that transmits a rotary drive force from the rotary drive source to the displacement member, the feed screw is constituted by a self-locking mechanism, which prevents the displacement member from being retracted as a result of a reactive force received from the workpiece by the gripper members in the case that the displacement member is advanced and the workpiece is gripped by the gripper members, and wherein the self-locking mechanism is capable of being released by transmittal of a rotary drive force from the rotary drive source to the feed screw.

In accordance with the foregoing structures, even in the case that the rotary drive source is halted in case of emergency, or when the supply of energy to the rotary drive source is interrupted, the pressed state or the gripped state of the workpiece by the pressing members or the gripper members can be preserved due to a locking operation performed by the self-locking mechanism. Therefore, when the pressed state or the gripped state of the workpiece is retained, since the supply of energy to the rotary drive source can be suspended, the consumption of energy can dramatically be reduced.

Further, in the self-locking mechanism, assuming that $\mu$ refers to a coefficient of friction of meshed portions between male threads disposed on the feed screw and female threads for converting the rotary drive force into an advancing or retracting force of the displacement member, and that $\theta$ refers to an angle between a direction of an axial force received by the feed screw when the workpiece is pressed by the pressing member and a direction of a normal force at the meshed portions between the male threads and the female threads, when $\mu$ and $\theta$ are set such that the relational expression $\mu \geq \sin \theta / \cos \theta$ is satisfied, the pressed state of the workpiece by the pressing member can reliably be retained by the self-locking mechanism. In this case, the relationship between the angle $\theta$ and the coefficient of friction $\mu$ is managed and set quantitatively based on the foregoing expression, whereby, for example, generation of biting or scraping between the male and female threads constituting the feed screw due to impact forces received when the workpiece W is pressed at high speeds can effectively be prevented, and the occurrence of faulty releasing of the self-locking mechanism can be avoided.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Below, detailed explanation shall be made with reference to the accompanying drawings concerning a drive mechanism according to the present invention and preferred embodiments relating to a gripper mechanism equipped with such a drive mechanism.

Figure 1:
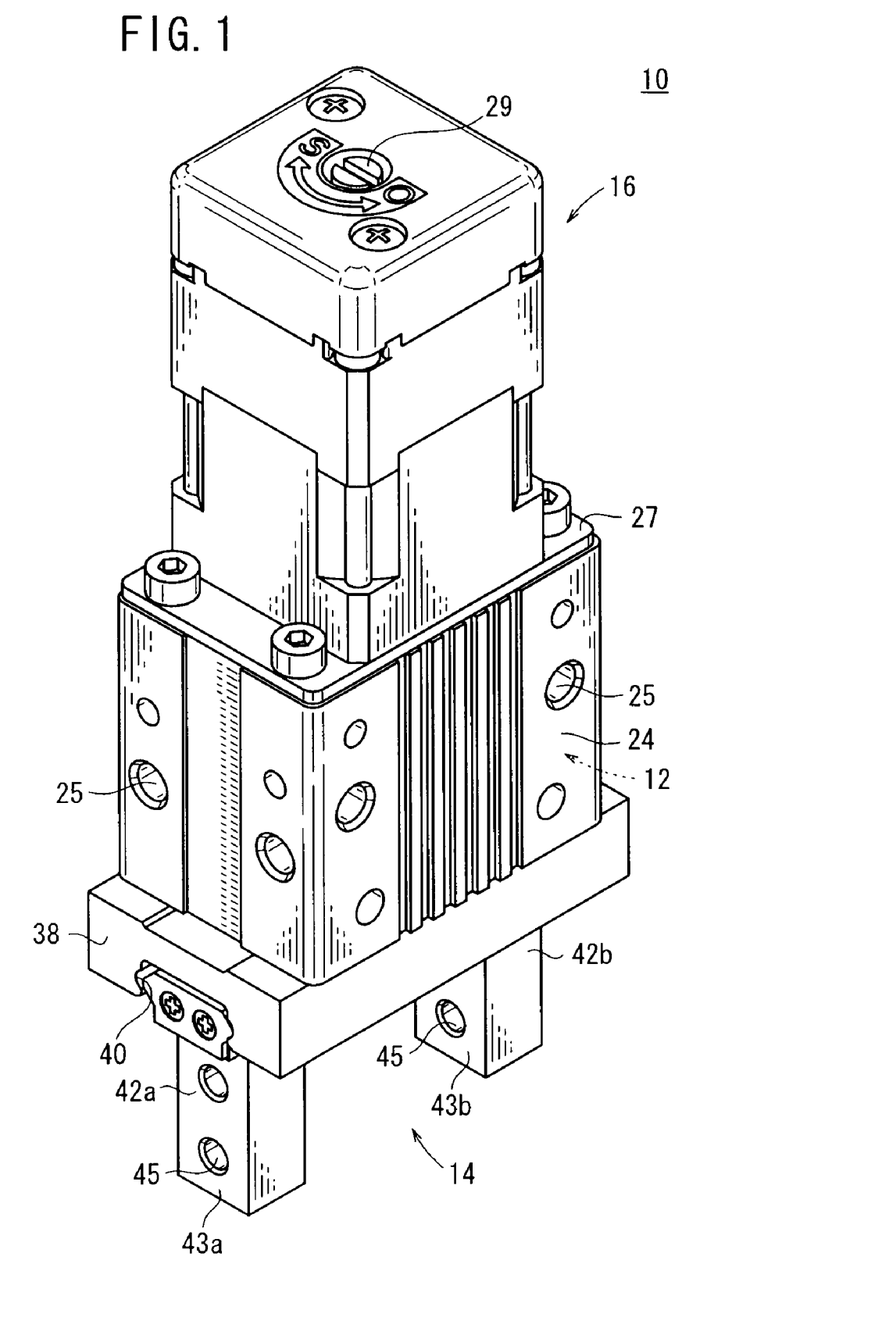
FIG. 1 is an outline perspective view of an electrical gripper that forms a gripper mechanism according to a first embodiment of the present invention.
Figure 2:
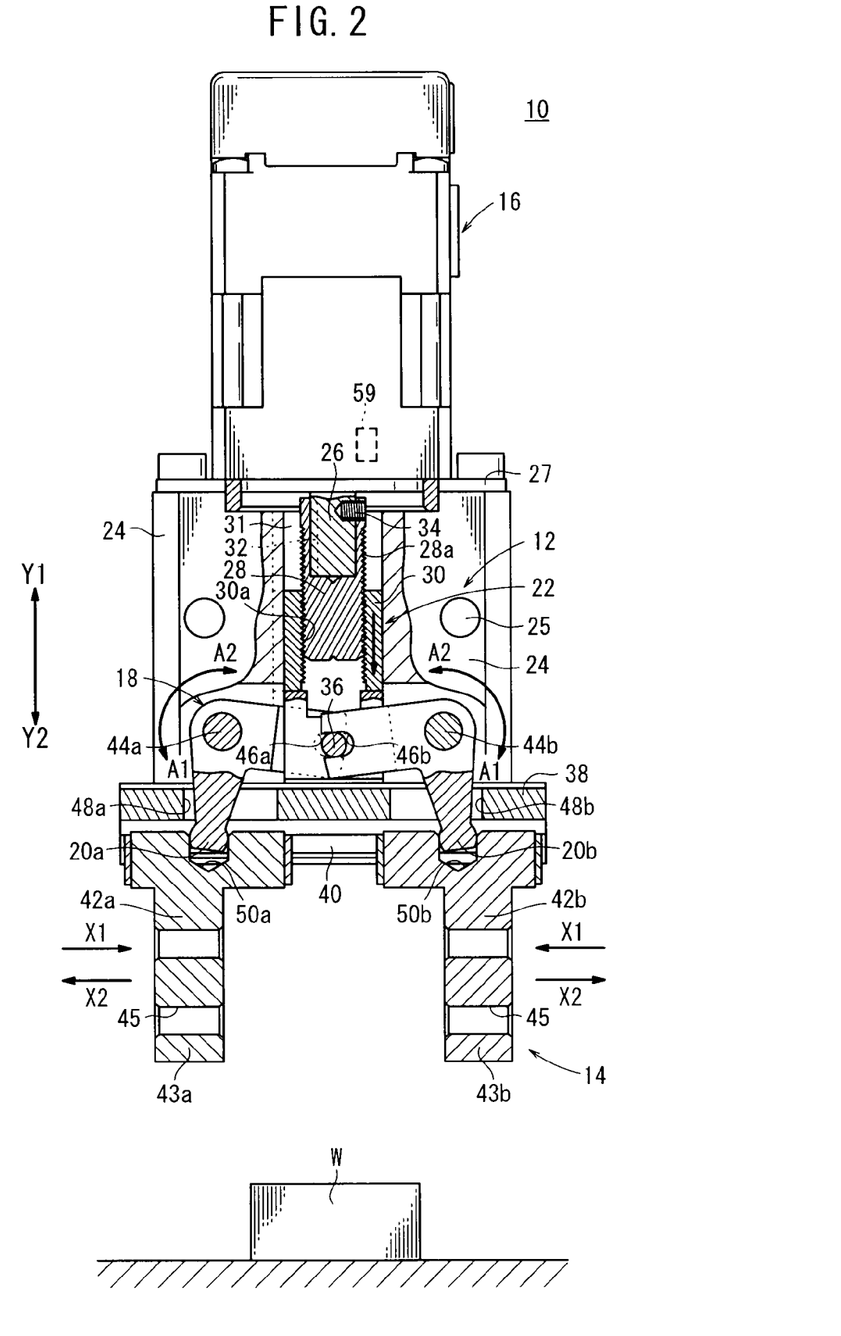
FIG. 2 is an outline cross sectional side view along an axial direction of the electrical gripper shown in FIG. 1.

As shown in FIGS. 1 and 2, an electrical gripper (electrical chuck) 10, as a gripper mechanism according to a first embodiment, is equipped with a drive mechanism 12 according to an embodiment, and includes a gripper section (chuck section) 14 for gripping a workpiece W that forms an object to be gripped, which is used, for example, by attachment onto an end of a shaft of a machine tool, an industrial robot, or the like.

The electrical gripper 10 is constituted by the gripper section 14, a drive mechanism 12 for driving the gripper section 14, and a housing 24.

The drive mechanism 12 comprises a motor (rotary drive source) 16 making up a drive source for opening/closing the gripper section 14, a link mechanism 18 that causes opening and closing of the gripper section 14, and a feed screw 22 for transmitting a rotary drive force from the motor 16 to a pair of link members 20a, 20b constituting the link mechanism 18.

The motor 16 is arranged on an upper surface of the housing 24, whereas the gripper section 14 is arranged on a lower surface thereof. The housing 24 is formed in a box shape accommodating the other components (i.e., the link mechanism 18, the feed screw 22, etc.) that make up the drive mechanism 12 thereinside. As shown in FIG. 1, a plurality of through holes 25 (four, in the case of the present embodiment) that penetrate through respective side surfaces of the housing 24 serve as attachment holes used, for example, when the electrical gripper 10 is affixed onto a machine tool.

In the drive mechanism 12, the motor 16 is constituted, for example, by a stepping motor, a servo motor or the like, which is fixed in an upstanding manner with respect to a rectangular ring shaped upper plate 27, which covers and closes an upper part of the housing 24, in a state where a drive shaft 26 is inserted into the housing 24. In FIG. 1, reference numeral 29 indicates an operating member formed by extending the drive shaft 26 toward a terminal end (upper end side in FIG. 1) of the motor 16. The operating member 29 enables the drive shaft 26 to be rotated manually by a non-illustrated tool or the like, for example, in cases such as when electrical power to the motor 16 is interrupted.

The feed screw 22 is formed from a screw shaft 28 that is fitted externally and coaxially with respect to one end of the drive shaft 26, a feed nut (displacement member, slide nut) 30 screw-engaged with the other end of the screw shaft 28, and a guide cylinder 31 in which the feed nut 30 is accommodated slidably in an axial direction (the directions of arrows Y1 and Y2). The screw shaft 28 is formed with male threads 28a on an outer circumferential surface thereof and the feed nut 30 is formed with female threads 30a on an inner circumferential side thereof, whereby the screw shaft 28 and the feed nut 30 are meshed with each other. Further, the screw shaft 28 and the drive shaft 26 are stopped against mutual rotation by a flat portion 32 formed on a part of the circumferential surface of the drive shaft 26 that contacts with the inner circumferential surface of the screw shaft 28, and a stop screw 34, which is threadedly inserted in a direction of a radius of the screw shaft 28.

The feed nut 30 is disposed so as to be capable of (sliding) displacement only along the axial direction (the direction of arrows Y1 and Y2), due to rotation thereof being regulated through a flat surface portion of the feed nut 30 or the like (not shown) which engages with the inner circumferential surface of the guide cylinder 31. Further, a groove extending along the axial direction is disposed on the inner circumferential surface of the guide cylinder 31, and a guide member that engages with the groove is provided on the feed nut 30, whereby rotation of the feed nut 30 is regulated such that the feed nut 30 is capable of displacement only in the axial direction. Further, a pin 36 engaging with link members 20a, 20b is disposed so as to project on an outer circumferential surface of a lower portion (on an opposite side from the motor 16 in the axial direction) of the feed nut 30.

The gripper section 14 includes a pair of gripper members (pressing members) 42a, 42b that are engaged with a rail member 40, which is installed on a lower plate 38 that closes and blocks the lower portion of the housing 24. The gripper members 42a, 42b are constructed so as to be displaceable in the directions of the arrows X1, X2 along the rail member 40, that is, so as to mutually approach and separate away from each other. The gripper members 42a, 42b are formed to be roughly T-shaped in cross section, wherein a pair of downwardly projecting claw members (pressing members) 43a, 43b function as a gripper for gripping the workpiece W. A plurality of holes 45 penetrate through the claw members 43a, 43b in the opening/closing directions (the direction of arrows X1 and X2) thereof. Gripper members, formed in appropriately desired shapes, also can be connected through the holes 45.

The two link members 20a, 20b are formed respectively to be substantially L-shaped in cross section. Bent center portions thereof are pivotally supported respectively by a pair of link pins 44a, 44b, which are disposed in the housing 24. Specifically, the link members 20a, 20b are swingable (rotatable) about the link pins 44a, 44b respectively in the directions of the arrows A1 and A2.

Further, semicircular shaped cutouts 46a, 46b are formed respectively in ends of the link members 20a, 20b. The cutouts 46a, 46b engage with the pin 36 at the lower portion of the feed nut 30. On the other hand, the other ends of the link members 20a, 20b are formed with tapering ends as viewed from the side as shown in FIG. 2. The tapered other end sides of the link members 20a, 20b are inserted through a pair of holes 48a, 48b formed in the lower plate 38, and are pivotally supported by non-illustrated pins or the like inside of grooves 50a, 50b disposed on upper portions of the gripper members 42a, 42b.

Accordingly, with the electrical gripper 10, by displacement of the feed nut 30 along the axial direction (the direction of the arrows Y1 and Y2), the pair of link members 20a, 20b engaged with the pin 36 are rotated respectively about the link pins 44a, 44b by predetermined angles in the directions of arrows A1 and A2. Furthermore, the pair of gripper members 42a, 42b is constructed so as to be displaceable along an axial direction of the rail member 40, in directions to approach and separate away from each other (the directions of arrows X1 and X2), under a rotary action of the link members 20a, 20b.

Next, descriptions shall be made concerning operations of the electrical gripper 10 constructed basically as described above.

First, the gripper members 42a, 42b that make up the gripper section 14 are placed beforehand in positions separated from each other, that is, such that the claw members 43a, 43b thereof are in an opened state. In this case, as shown in FIG. 2, the feed nut 30 is in a descended position, in the direction of the arrow Y2.

Next, electrical energy is supplied to the motor 16 from an unillustrated power source, whereupon the drive shaft 26 is rotated under a rotary drive action of the motor 16, and the screw shaft 28 that makes up the feed screw 22 is rotated integrally with the drive shaft 26. When this is done, the feed nut 30, rotation of which is regulated about the axial direction, is displaced upwardly in the axial direction (in the direction of the arrow Y1) by means of a screw-engaging action of the male threads 28a and the female threads 30a of the screw shaft 28.

Figure 3:
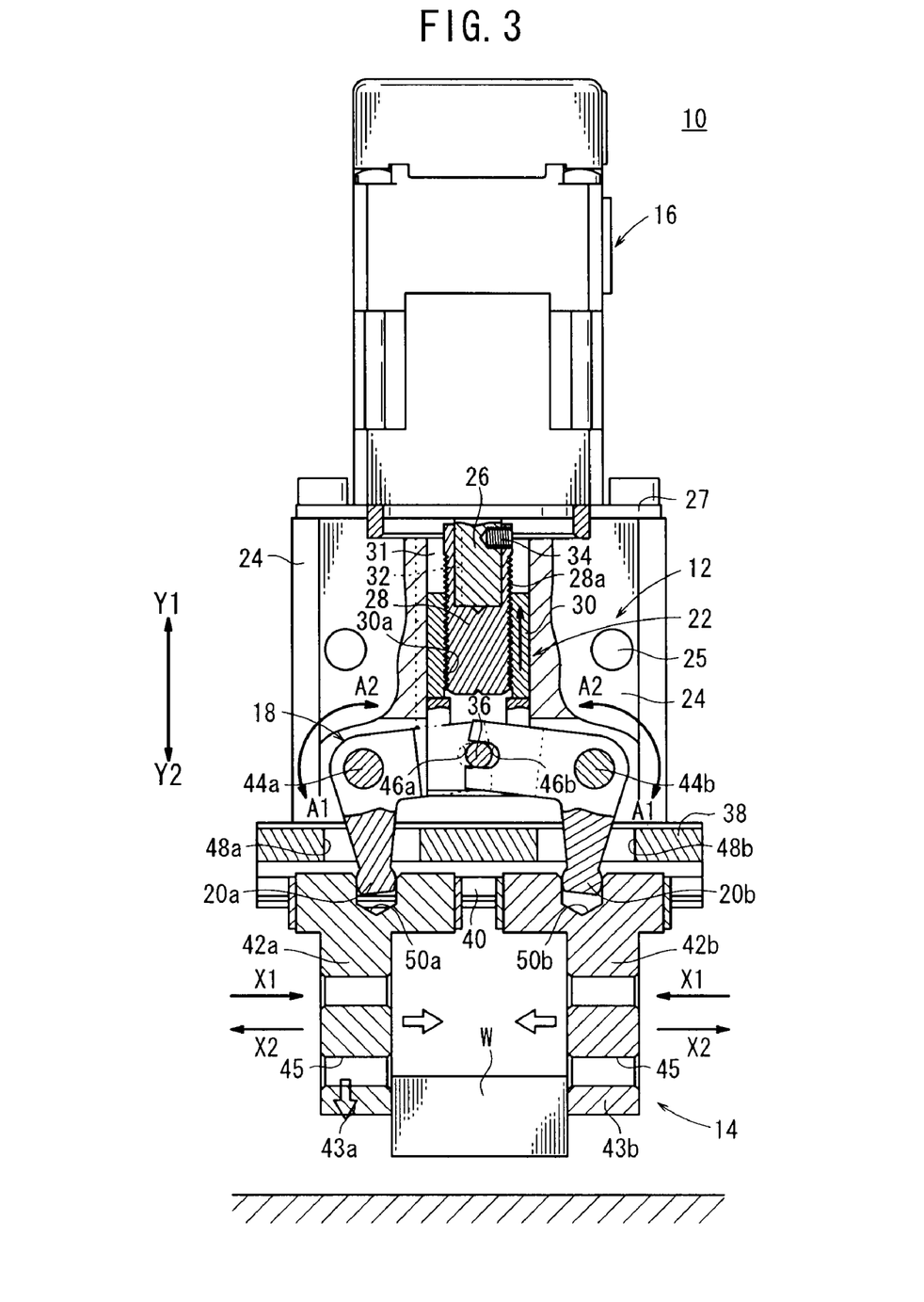
FIG. 3 is an outline cross sectional side view showing a state in which a gripper member is opened from the condition shown in FIG. 2.

When the feed nut 30 is displaced upwardly, as shown in FIG. 3, the link members 20a, 20b, ends of which are engaged with the pin 36 at the lower portion of the feed nut 30, are rotated about central regions (bent portions), which are axially supported by the link pins 44a, 44b, in directions (the direction of arrow A1) such that the other ends thereof, which are pivotally supported within the gripper members 42a, 42b, mutually approach toward each other. Under the rotary action of the link members 20a, 20b in the direction of the arrow A1, the gripper members 42a, 42b constituting the gripper section 14 are displaced along the rail member 40 in directions (the direction of arrow X1) to mutually approach toward each other, whereby the workpiece W can be gripped between the pair of claw members 43a, 43b (see FIG. 3).

Incidentally, after the workpiece W has been gripped by the gripper section 14 as shown in FIG. 3, in the event that the gripped state is maintained, that is, in cases such as when the workpiece W is gripped and displaced to a predetermined position and the workpiece W is clamped for a predetermined time, as described above, with a conventional electrical gripper it has been necessary to maintain supply of electricity to the motor. When the supply of electricity is halted, since the torque generated by the motor is lost, the clamping force on the workpiece also is lost and as a result the workpiece drops from the gripper.

Consequently, with the electrical gripper 10 according to the present embodiment, even in the event that supply of electricity to the motor 16 is interrupted or when the motor 16 experiences an abnormal stoppage or the like, a structure in which the opened/closed state of the gripper members 42a, 42b (claw members 43a, 43b) is maintained whereby the gripped state of the workpiece can be retained, that is, a so called self-locking mechanism, is provided in the drive mechanism 12 (feed screw 22).

Figure 4:
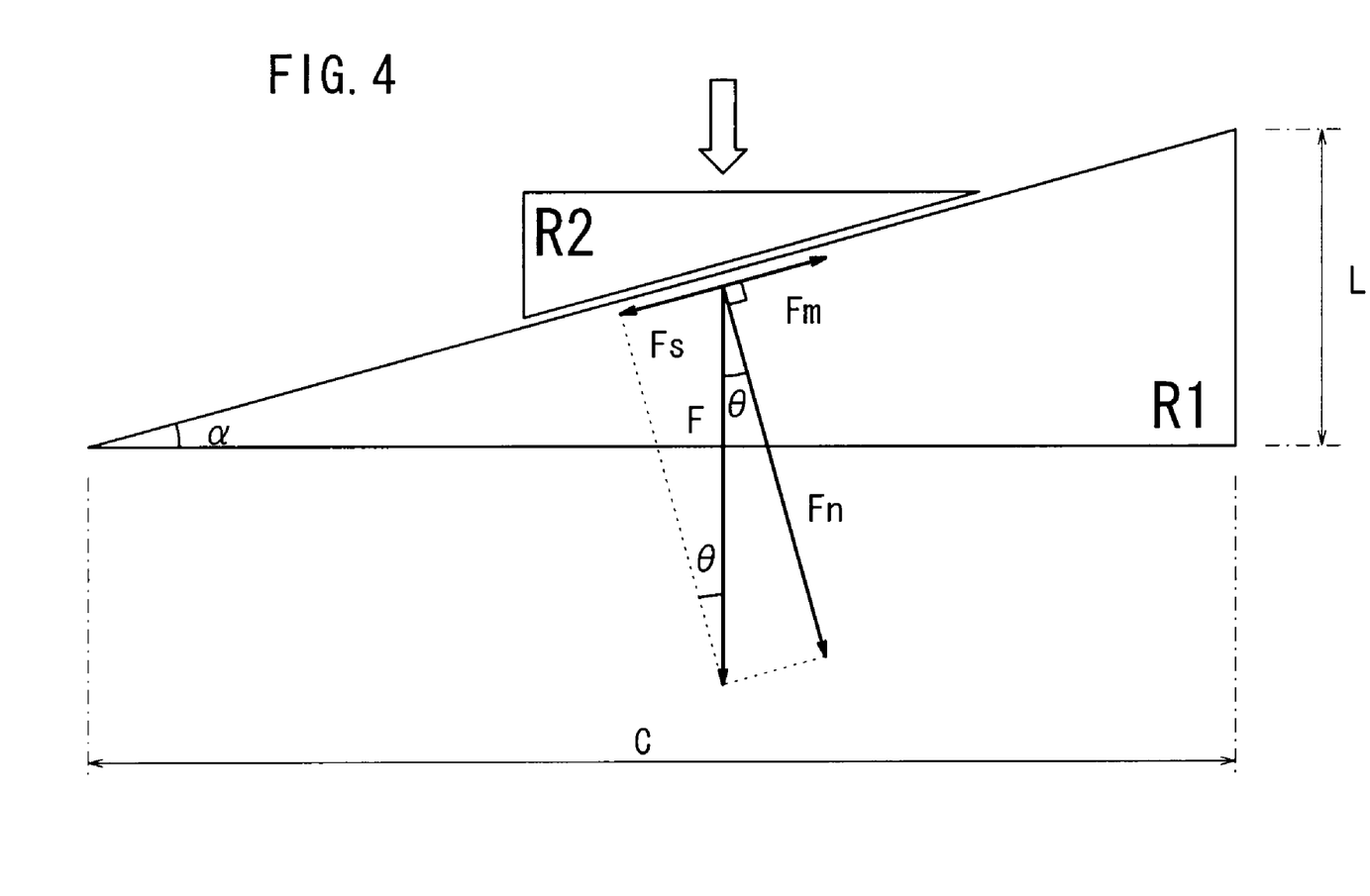
FIG. 4 is a schematic view for explaining a self-locking mechanism, which is provided in a feed screw constituting a drive mechanism according to an embodiment of the present invention.

FIG. 4 is a schematic view for explaining the self-locking mechanism, which is provided in a feed screw 22 constituting a drive mechanism 12 according to the present embodiment.

In FIG. 4, within regions R1 and R2 where the two right triangles are shown, the larger region R1 is a schematic diagram in which a ridge corresponding to the lead of the female threads 30a of the feed nut 30 is laid out. The height L indicates the lead L of the female threads 30a, the width C indicates the circumferential length of the effective diameter of the female threads 30a, and the angle $\alpha$ indicates the lead angle $\alpha$. Accordingly, the circumferential length C is calculated as $C=\pi \cdot D$ in the case that D is taken to be the diameter (effective diameter) of the female threads 30a and $\pi$ is taken to be the circle ratio. On the other hand, the smaller region R2 is a schematic diagram in which a ridge corresponding to the male threads 28a of the screw shaft 28, which are screw-engaged with the female threads 30a, is laid out. In FIG. 4, the relationship between the female threads 30a and the male threads 28a could also be reversed.

As understood from FIG. 2 and FIG. 3, with the electrical gripper 10, in order to maintain the gripped state of the workpiece W by the gripper section 14, it is necessary for the feed nut 30 to be prevented from being lowered in the direction of the arrow Y2 so as to be brought in the condition shown in FIG. 2 during gripping the workpiece W. That is, it is necessary to maintain the feed nut 30 in a position (see FIG. 3) such that the gripper section 14 keeps the workpiece W in a gripped state.

Consequently, with the self-locking mechanism provided in the drive mechanism 12 according to the present embodiment, the relationship between the female threads 30a and the male threads 28a that make up the feed screw 22 is regulated appropriately, whereby displacement (lowering) of the feed nut 30 in a state where the gripper section 14 has gripped the workpiece W is prevented.

More specifically, as shown in FIG. 4, the axial force F (N) refers to an axially directed force that acts on the feed nut 30 and the screw shaft 28 in a state in which the workpiece W is reliably gripped, the tangent force Fs (N) refers to a force in a meshing direction (tangential direction) of the female threads 30a and the male threads 28a, the normal force Fn (N) refers to a force in a direction perpendicular to the tangent force Fs, and Fm (N) refers to a frictional force at the meshing portion, which acts in a direction opposite to the tangential force Fs. Furthermore, $\mu$ refers to a coefficient of friction at the meshing portion (between mutually abutting flank portions) of the female threads 30a and the male threads 28a, and $\theta$ refers to the angle formed by the axial force F and the normal force Fn.

Thus defined, the condition (self-locking conditions) in order for the self-locking mechanism to function effectively requires a relationship in which the tangent force is less than the frictional force, or stated otherwise, wherein Fs<Fm.

In this case, because the following relationships are obtainable from FIG. 4, namely, $Fs=F \cdot \sin \theta$, $Fm=\mu \cdot Fn=\mu \cdot F \cdot \cos \theta$, the above-noted relational expression Fs<Fm can be converted to $F \cdot \sin \theta \leq \mu \cdot F \cdot \cos \theta$. From the foregoing relationships, a self-locking condition can be obtained in accordance with the following expression (1).

$$\mu \geq \sin \theta / \cos \theta \qquad (1)$$

Accordingly, in the drive mechanism 12 according to the present embodiment, self-locking conditions for the self-locking mechanism of the feed screw 22 are set based on expression (1). As a result, even in the case that electricity to the motor 16 is interrupted or the like, displacement of the feed nut 30 and opening of the gripper section 14 can effectively be avoided, and dropping of the workpiece W can be prevented.

When biting or scraping at the feed screw 22 occurs, as a result of impact forces, etc., at times when the gripper section 14 grips the workpiece W at high speeds, electrical releasing of the self-locking mechanism by the motor 16 becomes difficult, and the need for releasing the self-locking mechanism by means of an external force may occur. Consequently, by quantitatively managing the relationship between the frictional coefficient μ and the angle θ based on the above relational expression (1), the generation of biting or scraping at the feed screw 22 (i.e., between the female threads 30a and the male threads 28a) can effectively be avoided.

More specifically, concerning the self-locking mechanism of the feed screw 22, by setting up the relationship $\mu \geq \sin\theta/\cos\theta$ and bringing $\sin\theta/\cos\theta$ as close to the frictional coefficient μ as possible, the occurrence of such scraping by impact forces when the workpiece W is gripped at high speeds can be avoided. Naturally, if the frictional coefficient μ is set excessively large, releasing of the self-locking condition becomes impossible.

As an example of the structure for the feed screw 22, which can be constituted with the self-locking mechanism as described above, for example, as for the materials that form the female threads 30a and the male threads 28a, a slide screw (coefficient of friction μ=0.12) utilizing a fluorine and molybdenum coating on stainless steel can be used. In the slide screw, for example, any one from among three types of trapezoidal screw threads, wherein the angle θ shown in FIG. 4 equals 5.59°, 5.72° and 6.16°, can optionally be used. As for the trapezoidal screw threads, they can be exemplified by metric trapezoidal screw threads (Tr, trapezoidal form). In addition, as metric trapezoidal screw threads, in the case that the relationship between the outer shape, the pitch, and the number of threads is expressed by "outer shape (mm)×pitch (mm)×thread number", such metric trapezoidal screw threads can be exemplified by any of the following or similar configurations:

(1) "7×1×2", effective screw diameter ϕ=6.5 mm, lead=2 mm (θ=5.59°);

(2) "8×1.25×2", effective screw diameter ϕ=7.375 mm, lead=2.5 mm (θ=6.16°); or (3) "12×1.75×2", effective screw diameter ϕ=11.125 mm, lead=3.5 mm (θ=5.72°).

Further, the above metric trapezoidal screws are defined as "crews having a symmetrical cross sectional shape in which the cut between the crest and root of the threads is large, the diameter and pitch are expressed in millimeters, and the included angle is 30°."

In the above manner, with the electrical gripper 10 according to the present embodiment, the drive mechanism 12 (feed screw 22) is provided, which is equipped with a self-locking mechanism set based on the expression (1). Owing thereto, in a condition in which a workpiece W is gripped by the gripper section 14, even in cases where electrical power to the motor 16 is interrupted or when the motor 16 is stopped in case of emergency, the gripped state of the workpiece W can be maintained. Specifically, by means of the self-locking function between the feed nut 30 and the screw shaft 28, displacement of the feed nut 30 and displacement in the opening direction of the gripper members 42a, 42b can effectively be prevented. Stated otherwise, with the electrical gripper 10 according to the present embodiment, the gripper members 42a, 42b function as pressing members for pressing the workpiece W, and the pressed state thereby can be maintained by the self-locking mechanism disposed in the drive mechanism 12.

Accordingly, with the electrical gripper 10 (drive mechanism 12), electricity to the motor 16 can be interrupted while the workpiece W is gripped (pressed) by the gripper section 14. Owing thereto, the consumption of electrical energy can be significantly reduced. Further, heating of the motor 16 due to continuous energizing thereof can be reduced, thereby prolonging the service life of the motor 16. Furthermore, since there is no need to attach a separate braking mechanism or the like to the feed nut 30, the structure of the apparatus can be simplified and costs therefor can be reduced.

Further, in the present embodiment, frictional resistance between the female threads 30a and the male threads 28a is utilized as the self-locking mechanism. Owing thereto, by quantitatively managing the relationship between the frictional coefficient μ and the angle θ based on the above expression (1), biting or scraping at the feed screw 22, as a result of impact forces or the like transmitted to the feed screw 22 through the gripper members 42a, 42b and the link mechanism 18 when a workpiece W is gripped at high speeds, can effectively be avoided, and the occurrence of faulty releasing of the self-locking mechanism can reliably be prevented. That is, according to the present embodiment, the feed screw 22 is not influenced by the drive speed, and the self-locking mechanism can both reliably be operated and released.

Moreover, in the electrical gripper 10, a position sensor 59 may be disposed in the vicinity of the drive shaft 26 (see FIG. 2) for detecting a position at which the motor 16 has stopped, or for detecting the manner in which the motor 16 rotates. Additionally, positional information or the like detected by the position sensor 59 can be reverse-transmitted (fed back) to the motor 16 through a non-illustrated controller. In this case, when the motor 16 and the position sensor 59 are configured with separate power sources, since upon emergency stoppage or the like only the power source of the motor 16 is interrupted, the position sensor 59 also enables electrical restoration to be performed upon restarting. In other words, the detection result (position information, etc.) of the position sensor 59 is stored in memory and is not deleted.

Accordingly, at times when the electrical gripper 10 is stopped in case of emergency or the like, if only the electrical energy to the motor 16 is interrupted while electrical power continues to be supplied to the position sensor 59 for enabling observation and modifying of the position information, when the operation condition shifts from the emergency stopped state to the operating state, the electrical gripper 10 is capable of being restored electrically based on the position information of the drive shaft 26, which is stored in memory by the position sensor 59. Such a position sensor 59 may also be internally built into the motor 16 as one function of the motor 16.

After the workpiece W has been gripped with the electrical gripper 10 according to the present embodiment, in the case that the gripped state is released, the locked state of the self-locking mechanism can easily be released by causing the motor 16 to be rotated in a direction reverse to that used during gripping. Accordingly, the feed nut 30 can easily be made to descend in the direction of the arrow Y2, whereupon the gripper members 42a, 42b can be displaced in the opening direction (the direction of the arrow X2).

In addition, by setting the self-locking mechanism based on the relationship defined by the above expression (1), the occurrence of biting or scraping at the feed screw 22 can be avoided. Owing thereto, the locked state thereof can easily be released by the rotary drive force from the motor 16. That is, in the electrical gripper 10 (drive mechanism 12), the feed screw 22 is constructed with the self-locking mechanism, in which the feed nut 30 is not retracted (in the direction of the arrow Y2) due to a reactive force received by the gripper section 14 from the workpiece W in the case that the feed nut 30 is advanced (in the direction of the arrow Y1) and the workpiece W is gripped by the gripper section 14. Together therewith, the self-locking mechanism can be released simply by transmitting a rotary drive force to the feed screw 22 from the motor 16.

At times of emergency stoppage, in the case it becomes necessary to forcibly release gripping of the workpiece W, the self-locking mechanism of the feed screw 22 also can easily be released by manually operating the operating member 29, thereby enabling the workpiece W to be separated and removed from the gripper section 14.

Figure 5:
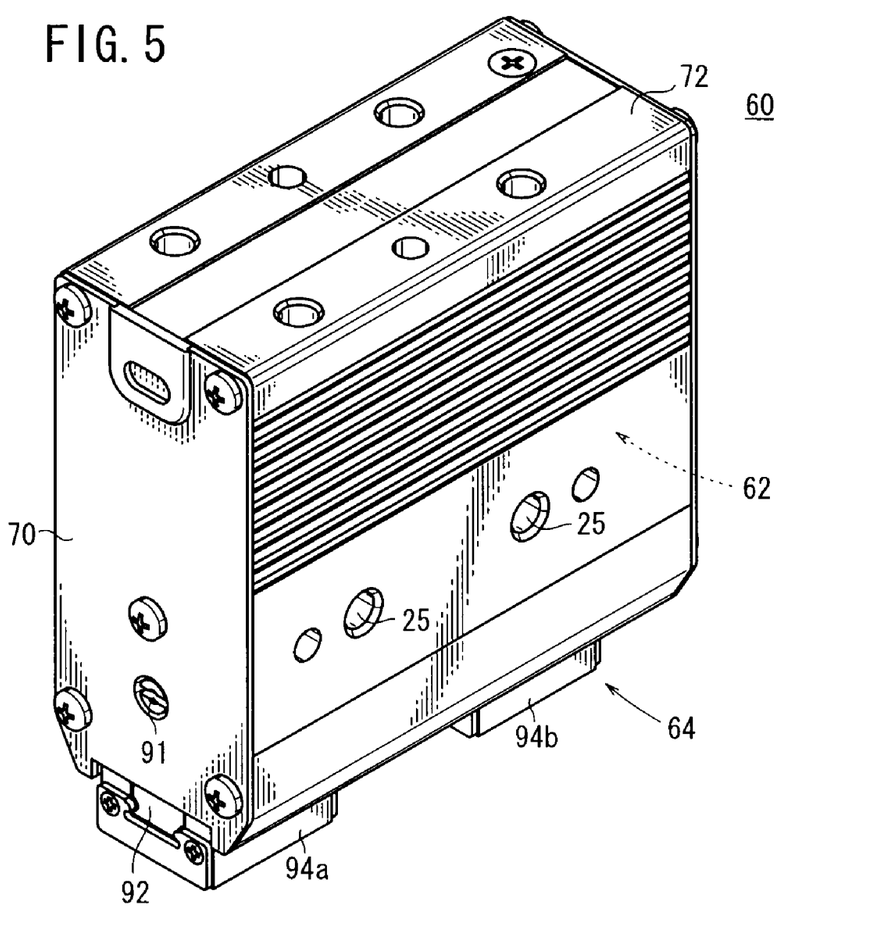
FIG. 5 is an outline perspective view of an electrical gripper that forms a gripper mechanism according to a second embodiment of the present invention.
Figure 6:
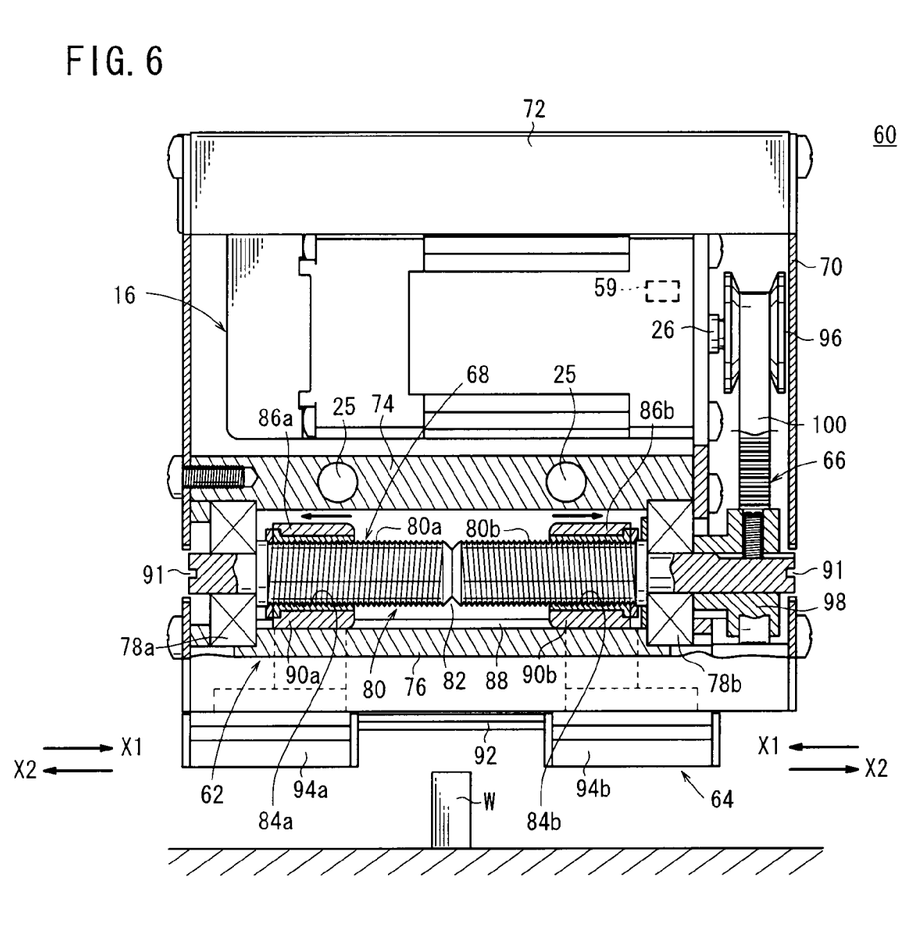
FIG. 6 is an outline cross sectional side view along an axial direction of the electrical gripper shown in FIG. 5.
Figure 7:
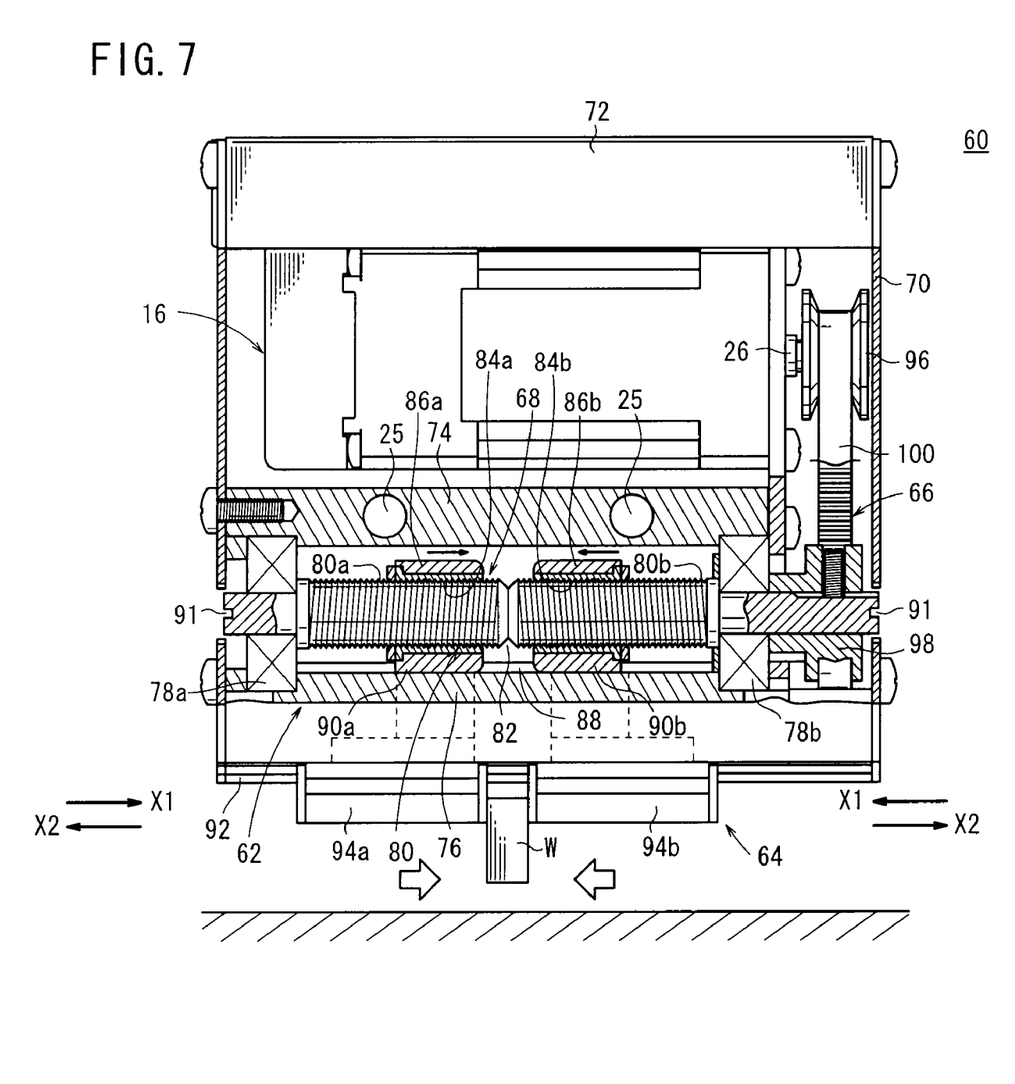
FIG. 7 is an outline cross sectional side view showing a state in which a gripper member is opened from the condition shown in FIG. 6.

Next, with reference to FIGS. 5 through 7, an electrical gripper 60 according to a second embodiment of the present invention shall be described. In the electrical gripper 60 shown in FIGS. 5 to 7, the same or similar structural features as in the electrical gripper 10 according to the first embodiment are designated using the same reference numerals and detailed explanations of such features are omitted.

The electrical gripper 60 is equipped with a drive mechanism 62, which functions substantially the same as the aforementioned drive mechanism 12, and is capable of gripping a workpiece W by a gripper section 64. Compared with the aforementioned electrical gripper 10, the electrical gripper 60 differs in that the motor 16 is installed horizontally, that is, the axial direction of the motor 16 is disposed along the opening/closing direction (the direction of arrows X1 and X2) of the gripper section 64 (see FIG. 6).

As shown in FIGS. 5 and 6, the electrical gripper 60 is constituted by the gripper section 64, a drive mechanism 62 for opening and closing the gripper section 64, and a housing 70.

The drive mechanism 62 comprises a motor (rotary drive source) 16 making up a drive source for opening/closing the gripper section 64, and a feed screw 68 for receiving a rotary drive force from the motor 16 for driving the gripper section 64 in the directions of arrows X1, X2 so as to open and close. The rotary drive force from the motor 16 is transmitted through a belt pulley mechanism 66 to the feed screw 68.

The housing 70 is formed in a box-like shape, wherein the gripper section 64 is arranged on a lower surface side of the housing 70, the motor 16 is accommodated in an upper portion of an internal space, whereas the feed screw 68 is accommodated in a lower portion thereof, and the belt pulley mechanism 66, which connects the motor 16 and the feed screw 68, is accommodated in a side portion of the housing 70.

In the drive mechanism 62, the drive shaft 26 of the motor 16 is arranged horizontally along the direction of arrows X1 and X2. The motor 16 is fixed between a rectangular upper plate 72 that closes the upper portion of the housing 70 and an intermediate plate 74 that partitions the interior of the housing 70 into upper and lower stages.

The feed screw 68 includes a screw shaft 80, both ends of which are axially supported by a pair of bearings 78a, 78b, which are fixed between a lower plate 76 that closes the lower portion of the housing 70 and the aforementioned intermediate plate 74. As shown in FIG. 6, the screw shaft 80 is disposed parallel to the axial direction of the motor 16, so as to be capable of rotation yet incapable of displacement in the axial direction (the direction of arrows X1 and X2). On the outer circumferential surface of the screw shaft 80, a pair of male threads 80a, 80b are formed, in which the spiral directions (helical directions) of the threads are formed with mutually opposite directions (symmetry). Stated otherwise, the male threads 80a, 80b are constructed as mutually opposite screws about an inversion position disposed substantially at the center of the screw shaft 80.

Further, in the feed screw 68, a pair of feed nuts (displacement members, slide nuts) 86a, 86b are provided, which are screw-engaged respectively with the male threads 80a, 80b of the screw shaft 80 by the formation of female threads 84a, 84b respectively on inner circumferential sides thereof. The feed nuts 86a, 86b each include guide members 90a, 90b, which engage with a guide groove 88 provided on the lower plate 76 and extending along the axial direction. Through engagement of the guide members 90a, 90b in the guide groove 88, the feed nuts 86a, 86b are capable of displacement (sliding) along the axial direction (in the directions of arrows X1 and X2) while rotation thereof is regulated about the axial direction.

In FIGS. 5 and 6, reference numeral 91 indicates an operating member that enables the screw shaft 80 to be operated manually from the outside. The operating member 91, similar to the aforementioned operating member 29, enables the screw shaft 80 to be rotated manually by a non-illustrated tool or the like, for example, in cases such as when electrical power to the motor 16 is interrupted.

The gripper section 64 includes a pair of gripper members (pressing members, claw members) 94a, 94b. The gripper members 94a, 94b are engaged with a rail member 92 attached to the lower plate 76 and which extends in the direction of arrows X1 and X2, such that the gripper members 94a, 94b are displaceable along the rail member 92. Accordingly, the gripper members 94a, 94b, as a result of being connected respectively to the feed nuts 86a, 86b, are capable of approaching toward and separating away from each other, thereby opening and closing, whereby the gripper members 94a, 94b function as a gripper for gripping the workpiece W.

The belt pulley mechanism 66 includes a drive pulley 96 connected to the drive shaft 26 of the motor 16, a driven pulley 98 connected to an end of the screw shaft 80, and a belt 100, which is wound around and between the drive pulley 96 and the driven pulley 98. Owing thereto, the rotary drive force from the motor 16 is transmitted from the drive shaft 26 to the screw shaft 80 through the belt pulley mechanism 66, whereby the screw shaft 80 can be driven rotatably.

Accordingly, in the electrical gripper 60, when the rotary drive force from the motor 16 is transmitted to the screw shaft 80 through the belt pulley mechanism 66, the feed nuts 86a, 86b, which are screw-engaged with the male threads 80a, 80b threaded in mutually opposite directions, are displaced in the directions of arrows X1 and X2. As a result, the pair of gripper members 94a, 94b are displaced in directions (the directions of arrows X1 and X2) to approach and separate from each other along the axial direction of the rail member 92, thus enabling the workpiece W to be gripped (see FIGS. 6 and 7).

As described above, in the electrical gripper 60 according to the present embodiment as well, gripping and releasing of the workpiece W can easily be carried out in substantially the same manner as the previously mentioned electrical gripper 10. That is, by rotary driving of the motor 16 in predetermined directions, the gripper members 94a, 94b can be displaced in desired opening/closing directions (the directions of arrows X1 and X2) through the belt pulley mechanism 66 and the feed screw 68.

At this time, concerning the drive mechanism 62 (feed screw 68) disposed in the electrical gripper 60, similar to the aforementioned drive mechanism 12 (feed screw 22), a self-locking mechanism is set up therein, as explained by FIG. 4 and the above expression (1), between the male threads 80a, 80b formed on the screw shaft 80 and the female threads 84a, 84b formed in the feed nuts 86a, 86b.

Owing thereto, similar to the case of the aforementioned electrical gripper 10, in the electrical gripper 60 as well, during a condition in which a workpiece W is gripped by the gripper section 64, even in cases where electrical power to the motor 16 is interrupted or when the motor 16 is stopped in case of emergency, the gripped state of the workpiece W can easily be maintained. Specifically, by means of the self-locking function between the feed nuts 86a, 86b and the screw shaft 80, displacement of the feed nuts 86a, 86b and displacement in the opening direction of the gripper members 94a, 94b can effectively be prevented. Accordingly, when the workpiece W is gripped by the gripper section 64, electrical power to the motor 16 can be interrupted and consumption of electrical energy can be reduced substantially. Naturally, reduction in heating of the motor 16 caused by continuous energizing thereof, as well as simplifying the apparatus structure and reducing costs therefor, can also effectively be obtained.

Further, in the electrical gripper 60 (drive mechanism 62) as well, the relationship between the frictional coefficient $\mu$ and the angle $\theta$ may be managed quantitatively based on the above expression (1). When this is carried out, the occurrence of biting or scraping between the screw shaft 80 and the feed nuts 86a, 86b that make up the feed screw 68, as a result of impact forces transmitted to the feed screw 68 from the gripper members 94a, 94b when a workpiece W is gripped at high speeds, and faulty releasing of the self-locking mechanism can be prevented.

In the foregoing manner, similar to the case of the electrical gripper 10 (drive mechanism 12), the feed screw 68 that makes up the electrical gripper 60 (drive mechanism 62) is constituted by a self-locking mechanism, in which the feed nuts 86a, 86b are not retracted (in the direction of arrow X2) by a reactive force received by the gripper section 64 from the workpiece W, in the case that the feed nuts 86a, 86b are advanced (in the direction of arrow X1) and the workpiece W is gripped by the gripper section 64. Furthermore, the self-locking mechanism is releasable by a rotary drive force from the motor 16 being transmitted to the feed screw 68.

Furthermore, with the electrical gripper 60, because the motor 16 is accommodated horizontally in parallel along the screw shaft 80, in comparison with the electrical gripper 10, the height dimension of the electrical gripper 60 can effectively be reduced.

The present invention is not limited to the aforementioned embodiments and it is a matter of course that various modifications can freely be made within a scope that does not deviate from the essence of the present invention.

For example, the gripper mechanism and the drive mechanism according to the present invention can be constituted by a structure that utilizes a pneumatic drive source or the like as the rotary drive source, apart from an electrical drive means such as the motor 16. In the case that a pneumatic drive source is used, energy can be accumulated by containment of air, and the gripped condition of the workpiece W can be maintained thereby. However, when it is considered that additional components such as a hermetic sealing structure, valves and the like, must be increased for the purpose of air containment in this manner, the invention is highly effective in that, through application of the self-locking mechanism of the present invention, both the structure and controls therefor can vastly be simplified.

Further, apart from the gripper mechanism, the drive mechanism according to the present invention is capable of being applied to other mechanisms, for example, such as a cylinder mechanism, an actuator mechanism, or the like, in which a displacement member (feed nut) is displaced through the feed screw, and a workpiece is pressed by a pressing member connected to an end of the displacement member. In this case as well, by adopting the self-locking mechanism based on the aforementioned expression (1), when the workpiece is retained in a pressed state by the pressing member, the pressed state can be maintained even when supply of electricity to the motor is interrupted. Further, as for the pressing member connected to the displacement member, an end of the displacement member itself may also function as the pressing member.

What is claimed is:

1. A drive mechanism comprising:
   a rotary drive source;
   a feed screw that transmits a rotary drive force generated from the rotary drive source to a displacement member that is displaceable in an axial direction; and
   a pressing member connected to the displacement member, that presses a workpiece by being displaced by the displacement member;
   the feed screw forming a self-locking mechanism, which prevents the displacement member from being displaced by a reactive force received by the pressing member from the workpiece when the rotary drive source stops generating the rotary drive force and the workpiece is pressed by the pressing member,
   wherein the self-locking mechanism is releasable by transmittal of the rotary drive force from the rotary drive source to the feed screw, and in the self-locking mechanism, where
   $\mu$ refers to a coefficient of friction of meshed portions between male threads disposed on the feed screw and female threads disposed on the displacement member that convert the rotary drive force into an advancing or retracting force of the displacement member, and
   $\theta$ refers to an angle between a direction of an axial force received by the feed screw when the workpiece is pressed by the pressing member and a direction of a normal force at the meshed portions between the male threads and the female threads,
   $\mu$ and $\theta$ are set such that the relational expression
   $\mu \geq \sin\theta/\cos\theta$
   is satisfied.

2. The drive mechanism according to claim 1, wherein the displacement member comprises a nut, and female threads formed on an inner surface of the nut are meshed with male threads formed on an outer surface of a screw shaft of the feed screw, which is driven rotatably by the rotary drive source, and
   wherein the nut receives a rotation of the screw shaft and is displaceable in the axial direction, the nut being disposed such that a rotation thereof is regulated about the axial direction.

3. The drive mechanism according to claim 2, further comprising:
   a link member which undergoes swinging movement upon displacement of the nut,
   wherein the link member is coupled to the pressing member.

4. The drive mechanism according to claim 1, further comprising:
   an operating member configured to be manually operable to release the self-locking mechanism from outside the drive mechanism.

5. The drive mechanism according to claim 1, wherein the feed screw includes a fluorine and molybdenum coating.

6. The drive mechanism according to claim 1, wherein the feed screw has trapezoidal screw threads, the angle $\theta$ is set to 5.59°, 5.72°, or 6.16°, and the coefficient of friction $\mu$ is set to 0.12.

7. The drive mechanism according to claim 1, further comprising:
   a sensor that detects a position at which the rotary drive source stops generating the rotary drive force or a manner in which the rotary drive source rotates, and the sensor and the rotary drive source are configured with separate power sources.

8. A gripper mechanism comprising:

a gripper section having a pair of gripper members to grip a workpiece by approaching and separating away mutually with respect to each other, thereby opening and closing; and a drive mechanism having a displacement member displaceable in an axial direction, the drive mechanism being coupled with the displacement member to openably/closably drive the pair of gripper members by displacement of the displacement member;

the drive mechanism having a rotary drive source, and a feed screw that transmits a rotary drive force generated from the rotary drive source to the displacement member;

the feed screw forming a self-locking mechanism, which prevents the displacement member from being displaced by a reactive force received by the gripper members from the workpiece when the rotary drive source stops generating the rotary drive force and the workpiece is gripped by the gripper members, wherein the self-locking mechanism is releasable by transmittal of the rotary drive force from the rotary drive source to the feed screw, and in the self-locking mechanism, where $\mu$ refers to a coefficient of friction of meshed portions between male threads disposed on the feed screw and female threads disposed on the displacement member that convert the rotary drive force into an advancing or retracting force of the displacement member, and $\theta$ refers to an angle between a direction of an axial force received by the feed screw when the workpiece is gripped by the gripper members and a direction of a normal force at the meshed portions between the male threads and the female threads, $\mu$ and $\theta$ are set such that the relational expression $\mu \geq \sin \theta / \cos \theta$ is satisfied.

9. The gripper mechanism according to claim 8, wherein the displacement member comprises a nut, and female threads formed on an inner surface of the nut are meshed with male threads formed on an outer surface of a screw shaft of the feed screw, which is driven rotatably by the rotary drive source, and wherein the nut receives a rotation of the screw shaft and is displaceable in the axial direction, the nut being disposed such that a rotation thereof is regulated about the axial direction.

10. The gripper mechanism according to claim 9, further comprising:

a pair of link members which undergo swinging movement upon displacement of the nut, wherein the pair of link members are coupled respectively to the pair of gripper members.

11. The gripper mechanism according to claim 9, wherein the nut includes a pair of nuts;

both ends of the screw shaft are formed with mutually opposite threads; and the pair of nuts are screw-engaged respectively with the opposite threads, the pair of nuts being connected respectively to the pair of gripper members.

12. The gripper mechanism according to claim 8, further comprising:

an operating member configured to be manually operable to release the self-locking mechanism from outside the drive mechanism.

13. The gripper mechanism according to claim 8, wherein the feed screw includes a fluorine and molybdenum coating.

14. The gripper mechanism according to claim 8, wherein the feed screw includes trapezoidal screw threads, the angle $\theta$ is set to 5.59°, 5.72°, or 6.16°, and the coefficient of friction $\mu$ is set to 0.12.

15. A drive mechanism comprising:

a rotary drive source;

means for transmitting a rotary drive force generated from the rotary drive source to a displacement member that is displaceable in an axial direction; and a pressing member connected to the displacement member, that presses a workpiece by being displaced by the displacement member;

the transmitting means forming self-locking means for preventing the displacement member from being displaced by a reactive force received by the pressing member from the workpiece when the rotary drive source stops generating the rotary drive force and the workpiece is pressed by the pressing member, wherein the self-locking means is releasable by transmittal of the rotary drive force from the rotary drive source to the transmitting means, and in the self-locking means, where $\mu$ refers to a coefficient of friction of meshed portions between male threads disposed on the transmitting means and female threads disposed on the displacement member that convert the rotary drive force into an advancing or retracting force of the displacement member, and $\theta$ refers to an angle between a direction of an axial force received by the transmitting means when the workpiece is gripped by the pressing member and a direction of a normal force at the meshed portions between the male threads and the female threads, $\mu$ and $\theta$ are set such that the relational expression $\mu \geq \sin \theta / \cos \theta$ is satisfied.

16. A drive mechanism comprising:

a rotary drive source;

a feed screw that transmits a rotary drive force generated from the rotary drive source to a displacement member that is displaceable in an axial direction; and a pressing member connected to the displacement member, that presses a workpiece by being displaced by the displacement member; and an operating member;

the feed screw forming a self-locking mechanism, which prevents the displacement member from being displaced by a reactive force received by the pressing member from the workpiece when the rotary drive source stops generating the rotary drive force and the workpiece is pressed by the pressing member, wherein the self-locking mechanism is releasable by transmittal of the rotary drive force from the rotary drive source to the feed screw, and wherein the operating member is configured to be manually operable to release the self-locking mechanism from outside the drive mechanism.

17. A drive mechanism comprising:
a rotary drive source;
a feed screw that transmits a rotary drive force generated from the rotary drive source to a displacement member that is displaceable in an axial direction; and
a pressing member connected to the displacement member, that presses a workpiece by being displaced by the displacement member;
the feed screw including a fluorine and molybdenum coating and forming a self-locking mechanism, which prevents the displacement member from being displaced by a reactive force received by the pressing member from the workpiece when the rotary drive source stops generating the rotary drive force and the workpiece is pressed by the pressing member,
wherein the self-locking mechanism is releasable by transmittal of the rotary drive force from the rotary drive source to the feed screw.

* * * * *